(12) United States Patent
Nitta et al.

(10) Patent No.: US 11,189,830 B2
(45) Date of Patent: Nov. 30, 2021

(54) AQUEOUS SOLUTION ELECTROLYTE SECONDARY BATTERY

(71) Applicants: Sumitomo Electric Industries, Ltd., Osaka (JP); Tokyo Denki University, Tokyo (JP)

(72) Inventors: Koji Nitta, Osaka (JP); Shoichiro Sakai, Osaka (JP); Atsushi Fukunaga, Osaka (JP); Kazuki Okuno, Itami (JP); Naoaki Yabuuchi, Tokyo (JP)

(73) Assignees: Sumitomo Electric Industries, Ltd., Osaka (JP); Tokyo Denki University, Tokyo (JP)

( * ) Notice: Subject to any disclaimer, the term of this patent is extended or adjusted under 35 U.S.C. 154(b) by 312 days.

(21) Appl. No.: 16/494,080

(22) PCT Filed: Mar. 8, 2018

(86) PCT No.: PCT/JP2018/009028
§ 371 (c)(1),
(2) Date: Sep. 13, 2019

(87) PCT Pub. No.: WO2018/168650
PCT Pub. Date: Sep. 20, 2018

(65) Prior Publication Data
US 2020/0136136 A1 Apr. 30, 2020

(30) Foreign Application Priority Data
Mar. 15, 2017 (JP) .............................. JP2017-049707

(51) Int. Cl.
*H01M 4/485* (2010.01)
*H01M 4/02* (2006.01)

(52) U.S. Cl.
CPC ...... *H01M 4/485* (2013.01); *H01M 2004/027* (2013.01); *H01M 2300/0002* (2013.01)

(58) Field of Classification Search
CPC ................. H01M 4/485; H01M 10/36; H01M 2004/027; H01M 2300/0002; H01M 4/74; H01M 4/80; Y02E 60/10
See application file for complete search history.

(56) References Cited

PUBLICATIONS

Hoshino, Reversible three-electron redox reaction of Mo3+/Mo6+ for rechargeable lithium batteries, ACS Energy Letters, 2017, 2, 733-738.*

(Continued)

*Primary Examiner* — Cynthia K Walls
(74) *Attorney, Agent, or Firm* — Baker Botts L.L.P.; Michael A. Sartori

(57) ABSTRACT

An aqueous solution electrolyte secondary battery includes: a positive electrode including a positive electrode active material that reversibly occludes and releases lithium ions; a negative electrode including a negative electrode active material that reversibly occludes and releases lithium ions; and an aqueous solution electrolyte in which a lithium salt is dissolved. The negative electrode active material contains Mo, at least part of the Mo causes an oxidation-reduction reaction of $Mo^{3+}/Mo^{6+}$ through charging and discharging, and a potential window for charging and discharging exceeds 2.0 V.

8 Claims, 5 Drawing Sheets

(56) References Cited

PUBLICATIONS

Liumin Suo et al., "'Water-in-salt' electrolyte enables high-voltage aqueous lithium-ion chemistries," Science, vol. 350, Issue 6263, Nov. 20, 2015, pp. 938-943.
Liumin Suo et al., "'Water-in-salt' electrolyte enables high-voltage aqueous lithium-ion chemistries," Science, vol. 350, Issue 6263, Nov. 20, 2015, p. 938.

\* cited by examiner

AQUEOUS SOLUTION ELECTROLYTE SECONDARY BATTERY

TECHNICAL FIELD

The present disclosure relates to an aqueous solution electrolyte secondary battery. This application claims priority on Japanese Patent Application No. 2017-049707 filed on Mar. 15, 2017, the entire contents of which are incorporated herein by reference.

BACKGROUND ART

NON PATENT LITERATURE 1 proposes a lithium ion secondary battery including: an aqueous solution electrolyte that contains a high concentration of lithium bis(trifluoromethylsulfonyl)imide (TFSI); a positive electrode that includes $LiMn_2O_4$; and a negative electrode active material that causes $Mo_6S_8$.

CITATION LIST

Non Patent Literature

NON PATENT LITERATURE 1: K. Xu et al., Science, 350, 938 (2015)

SUMMARY OF INVENTION

An aspect of the present disclosure is directed to an aqueous solution electrolyte secondary battery including: a positive electrode including a positive electrode active material that reversibly occludes and releases lithium ions; a negative electrode including a negative electrode active material that reversibly occludes and releases lithium ions; and an aqueous solution electrolyte in which a lithium salt is dissolved, wherein the negative electrode active material contains Mo, at least part of the Mo causes an oxidation-reduction reaction of $Mo^{3+}/Mo^{6+}$ through charging and discharging, and a potential window for charging and discharging exceeds 2.0 V.

Another aspect of the present disclosure is directed to an aqueous solution electrolyte secondary battery including: a positive electrode including a positive electrode active material that reversibly occludes and releases lithium ions; a negative electrode including a negative electrode active material that reversibly occludes and releases lithium ions; and an aqueous solution electrolyte in which a lithium salt is dissolved, wherein the negative electrode active material contains Mo, at least part of the Mo causes an oxidation-reduction reaction of $Mo^{3+}/Mo^{6+}$ through charging and discharging, and at least part of the aqueous solution electrolyte forms a room temperature molten hydrate.

DESCRIPTION OF EMBODIMENTS

Problems to be Solved by Disclosure

Figure 1:
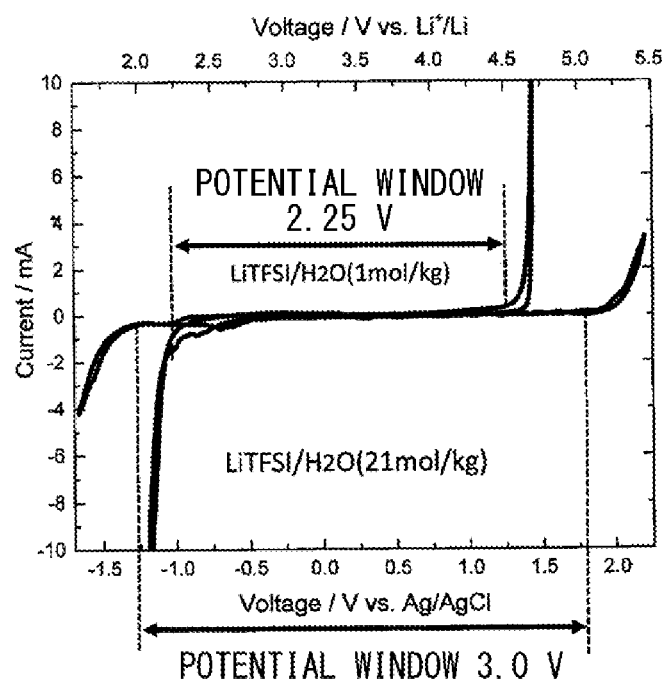
FIG. 1 is a diagram showing change of oxidation and reduction currents when a voltage for a standard electrode is applied to a working electrode immersed in a LiTFSI aqueous solution.

The battery proposed in NON PATENT LITERATURE 1 has a potential window of 2 V class, which exceeds the theoretical decomposition voltage of water, but has a low capacity, and thus it is difficult to put the battery into practical use. In addition, development of a secondary battery that has a wider potential window, that has high practicability, and that includes an aqueous solution electrolyte, is desired.

Meanwhile, development of a positive electrode for a high-capacity lithium ion secondary battery that uses an oxidation-reduction reaction of $Mo^{3+}/Mo^{6+}$, which is a three-electron reaction, is in progress. For example, Yabuuchi et al. have found that a single-phase oxide obtained by mechanically milling $LiMoO_2$ and $Li_3NbO_4$ exhibits a capacity of about 250 mAh/g and indicates good cycle characteristics. However, as compared to a conventional positive electrode active material that causes a multi-electron reaction (for example, $LiNi_{1/2}Mn_{1/2}O_2$), a high voltage is not obtained, which is a problem for practical use (ACS Energy Lett., 2017, 2, pp 733-738).

Advantageous Effects of Disclosure

With the aqueous solution electrolyte secondary battery according to the present disclosure, a high capacity and a high voltage can be obtained while electrolysis of water is inhibited.

DESCRIPTION OF EMBODIMENTS

First, contents of embodiments of the present invention will be listed and described.

(1) An aqueous solution electrolyte secondary battery according to an embodiment of the present disclosure includes: a positive electrode including a positive electrode active material that reversibly occludes and releases lithium ions; a negative electrode including a negative electrode active material that reversibly occludes and releases lithium ions; and an aqueous solution electrolyte in which a lithium salt is dissolved. The negative electrode active material contains Mo and is configured such that at least part of the Mo causes an oxidation-reduction reaction of $Mo^{3+}/Mo^{6+}$ through charging and discharging, and the aqueous solution electrolyte is configured such that a potential window for charging and discharging exceeds 2.0 V (for example, to have a potential window of 2.1 V or higher). The oxidation-reduction reaction of $Mo^{3+}/Mo^{6+}$ means a three-electron reaction in which, as in the following formula (A), Mo is reduced to trivalent Mo during charging of the battery, and Mo is oxidized to hexavalent Mo during discharging of the battery.

$$Mo^{3+} \leftrightarrow Mo^{6+} + 3e-$$ Formula (A)

(2) The negative electrode active material preferably contains a complex oxide containing tetravalent or higher transition metal Me, trivalent Mo, and Li. By complexing transition metal Me and trivalent Mo, Mo becomes capable of causing a two-electron reaction of $Mo^{3+}/Mo^{5+}$ and a three-electron reaction of $Mo^{3+}/Mo^{6+}$ in addition to an oxidation-reduction reaction of $Mo^{3+}/Mo^{4+}$. With a combination of the above elements, it is possible to design various high-capacity negative electrode active materials. The transition metal Me may be tetravalent to hexavalent Mo.

(3) From the standpoint that a high capacity can be obtained, preferably, the complex oxide containing transition metal Me, trivalent Mo, and Li contains at least one single-phase oxide selected from the group consisting of single-phase oxides having compositions of formula [1]: $xLiMoO_2$-$(1-x)Li_3NbO_4$, formula [2]: $xLiMoO_2$-$(1-x)Li_4MoO_5$, and formula [3]: $xLiMoO_2$-$(1-x)Li_2TiO_3$, and formulas [1] to [3] satisfy $0<x<1$.

(4) The aqueous solution electrolyte preferably contains a lithium bis(perfluoroalkylsulfonyl)imide as at least part of the lithium salt. When the lithium bis(perfluoroalkylsulfonyl)imide is used, an aqueous solution electrolyte in which electrolysis of water is considerably inhibited can be obtained.

(5) At least part of the aqueous solution electrolyte preferably forms a room temperature molten hydrate. The room temperature molten hydrate is a hydrate of a metal salt having sufficient fluidity at room temperature (25° C.). By using the room temperature molten hydrate, an aqueous solution electrolyte in which electrolysis of water is further considerably inhibited can be obtained.

(6) An aqueous solution electrolyte secondary battery according to another embodiment of the present disclosure includes: a positive electrode including a positive electrode active material that reversibly occludes and releases lithium ions; a negative electrode including a negative electrode active material that reversibly occludes and releases lithium ions; and an aqueous solution electrolyte in which a lithium salt is dissolved. The negative electrode active material contains Mo and is configured such that at least part of the Mo causes an oxidation-reduction reaction of $Mo^{3+}/Mo^{6+}$ through charging and discharging, and at least part of the aqueous solution electrolyte forms a room temperature molten hydrate. According to the above configuration, an aqueous solution electrolyte secondary battery having a potential window for charging and discharging exceeding 2.0 V (for example, having a potential window of 2.1 V or higher) can be easily obtained.

(7) Preferably, when the positive electrode includes a positive electrode current collector and a positive electrode mixture including the positive electrode active material supported on the positive electrode current collector, and the negative electrode includes a negative electrode current collector and a negative electrode mixture including the negative electrode active material supported on the negative electrode current collector, at least one of the positive electrode current collector and the negative electrode current collector has a three-dimensional network metallic skeleton. With such a combination of the current collectors and the aqueous solution electrolyte, even if a thick high-capacity positive electrode and negative electrode are used, high utilization rates of the active materials can be achieved.

DETAILS OF EMBODIMENTS

Next, embodiments of the present disclosure will be further specifically described. It should be noted that the present invention is not limited to these examples but is indicated by the appended claims, and is intended to include meaning equivalent to the claims and all modifications within the scope of the claims.

<Positive Electrode Active Material>

A positive electrode including a positive electrode active material that reversibly occludes and releases lithium ions only needs to be a material that has sufficiently higher potential than a negative electrode active material, and, for example, a lithium-containing transition metal oxide that can exhibit a potential of 4 V or higher with respect to metal lithium can be used. Examples of typical materials include lithium-containing transition metal oxides such as $LiCoO_2$, $LiNiO_2$, $LMn_2O_4$, $LiCo_{1/3}Ni_{1/3}Mn_{1/3}O_2$, and $LiNi_{1/2}Mn_{3/2}O_4$.

<Negative Electrode Active Material>

A negative electrode active material that reversibly occludes and releases lithium ions contains at least Mo, from the standpoint of achieving a high capacity. In the case of $LiMoO_2$ having a typical layered structure, a single-electron reaction of $Mo^{3+}/Mo^{4+}$ is used. Meanwhile, in a negative electrode active material prepared by using a predetermined method, at least part of the Mo causes a three-electron reaction of $Mo^{3+}/Mo^{6+}$ associated with charging and discharging.

As a Mo-containing material that can use a three-electron reaction of $Mo^{3+}/Mo^{6+}$, $Li_2MoO_4$, $MoO_3$, $MoO_2$, or the like, which contains Mo having a higher number of valence, can be used, but a binary transition metal complex oxide that contains trivalent Mo and tetravalent or higher transition metal Me is preferable. Among such binary transition metal complex oxides, at least one single-phase oxide selected from the group consisting of single-phase oxides having compositions of formula [1]: $xLiMoO_2$-$(1-x)Li_3NbO_4$ ($0<x<1$), formula [2]: $xLiMoO_2$-$(1-x)Li_4MoO_5$ ($0<x<1$), and formula [3]: $xLiMoO_2$-$(1-x)Li_2TiO_3$ ($0<x<1$), is preferable.

The crystal structures of the single-phase oxides represented by formulas [1] to [3] are similar cation-disordered rock salt structures, and these single-phase oxides are promising materials that have water resistance and can achieve a capacity of 250 mAh/g or higher. In powder X-ray diffraction analysis (XRD) using CuKα radiation for these single-phase oxides, peaks attributed to the (111) plane, the (200) plane, and the (220) plane of the cation-disordered rock salt structure are observed at approximately $2\theta=38°$, $42°$, and $63°$, respectively.

Among formulas [1] to [3], a niobium oxide represented by formula [1] and a hexavalent molybdenum oxide represented by formula [2] are preferable since a high voltage is easily obtained. In addition, the hexavalent molybdenum oxide is most preferable since a high capacity and very good cycle characteristics are obtained.

The single-phase oxides represented by formulas [1] to [3] represent a solid solution of x moles of $LiMoO_2$ and $(1-x)$ moles of $Li_3NbO_4$, a solid solution of x moles of $LiMoO_2$ and $(1-x)$ moles of $Li_4MoO_5$, and a solid solution of x moles of $LiMoO_2$ and $(1-x)$ moles of $Li_2TiO_3$, respectively. In formulas [1] to [3], $LiMoO_2$ contains trivalent Mo. Meanwhile, $Li_3NbO_4$, $Li_4MoO_5$, and $Li_2TiO_3$ contain pentavalent Nb, hexavalent Mo, and tetravalent Ti, respectively, as the transition metal Me.

A preferable range of x is 0.2<x<0.9, and a more preferable range of x is 0.3<x<0.8. More specifically, an example of the single-phase oxide represented by formula [1] is $Li_{9/7}Nb_{2/7}Mo_{3/7}O_2$ (x=0.6), an example of the single-phase oxide represented by formula [2] is $Li_{4/3}Mo^{VI}_{2/9}M^{III}_{4/9}O_2$ (x=2/3), and an example of the single-phase oxide represented by formula [3] is $Li_{6/5}Ti_{2/5}Mo_{2/5}O_2$ (x=0.5).

The single-phase oxides within the scope of formulas [1] to [3] or single-phase oxides similar thereto can also be represented by $Li_{1.5\ x/2}Nb_{0.5\ x/2}Mo_xO_2$, $Li_{1.6-3x/5}Mo^{VI}_{0.4-2x/5}Mo^{III}_xO_2$, and $Li_{1.33-x/3}Ti_{0.67-2x3}Mo_xO_2$.

The negative electrode active materials represented by formulas [1] to [3] are each preferably produced by mechanically milling a raw material mixture. The raw material mixture is a mixture of a first raw material containing trivalent Mo and a second raw material containing tetravalent or higher transition metal Me. $LiMoO_2$ is preferably used as the first raw material, and at least one material selected from the group consisting of $Li_3NbO_4$, $Li_4MoO_5$, and $Li_2TiO_3$ is preferably used as the second raw material. By the mechanical milling of the raw material mixture, a mechanochemical reaction proceeds. To obtain a single-phase oxide, the mechanical milling is preferably performed until peaks attributed to the first raw material and the second raw material are substantially no longer observed in XRD. Peaks attributed to the first raw material and the second raw material are observed, for example, within the range of 2θ=15° to 37°.

<Aqueous Solution Electrolyte>

An aqueous solution electrolyte is prepared as an aqueous solution obtained by dissolving a lithium salt in water. The aqueous solution electrolyte not only has high safety and good ion conductivity but also has an advantage of being capable of supplying water, which boasts of being a resource with an abundant resource amount, at low cost.

A stable potential window with respect to electrolysis of water is theoretically 1.23 V. The stable potential window with respect to electrolysis is widened by dissolving a high concentration of the lithium salt in water. To design a battery that exhibits a voltage exceeding 2 V, it is necessary to dissolve the lithium salt at a high concentration in the aqueous solution electrolyte such that a stable potential window with respect to electrolysis of water in the electrolyte exceeds 2 V, preferably exceeds 3 V. The concentration of the lithium salt may be selected as appropriate depending on the type of the lithium salt. The upper limit of the concentration of the lithium salt in the aqueous solution electrolyte is not particularly limited as long as the lithium salt is dissolved in water.

The lithium salt preferably has high resistance to hydrolysis and high solubility in water. Examples of such a salt include organic imide salts and inorganic salts. Among them, organic imide salts are preferable, and the main component (50 mole % or greater, further 80 mole % or greater) of the lithium salt is preferably an organic imide salt.

Among organic imide salts, a lithium bis(perfluoroalkylsulfonyl)imide is preferably contained. The lithium bis(perfluoroalkylsulfonyl)imide is electrochemically stable even in an aqueous solution, and also forms a hydrate together with water molecules in a high-concentration aqueous solution. By water molecules forming a hydrate, electrolysis of water is considerably inhibited.

Specific examples of the lithium bis(perfluoroalkylsulfonyl)imide include lithium bis(trifluoromethylsulfonyl)imide (LiTFSI), lithium bis(pentafluoroethylsulfonyl)imide (Li-BETI), and lithium (trifluoroethylsulfonyl)(pentafluoroethylsulfonyl)imide.

At least part of the aqueous solution electrolyte preferably forms a room temperature molten hydrate, and the entirety or 90 mass % or greater of the aqueous solution electrolyte preferably forms a room temperature molten hydrate. The room temperature molten hydrate is easily generated by dissolving a high concentration of the lithium bis(perfluoroalkylsulfonyl)imide in water.

In the case of using a room temperature molten hydrate as the aqueous solution electrolyte, it is also possible to form an aqueous solution electrolyte secondary battery having, for example, a potential window of 2.2 V or higher, further about 3 V. For example, stable potential windows with respect to electrolysis of LiTFSI aqueous solutions having concentrations of 1 mol/kg and 21 mol/kg are 2.25 V and 3.0 V, respectively, as shown in FIG. 1. FIG. 1 shows change of an oxidation current and a reduction current when a voltage for a standard electrode is applied to a working electrode of stainless steel.

Figure 2:
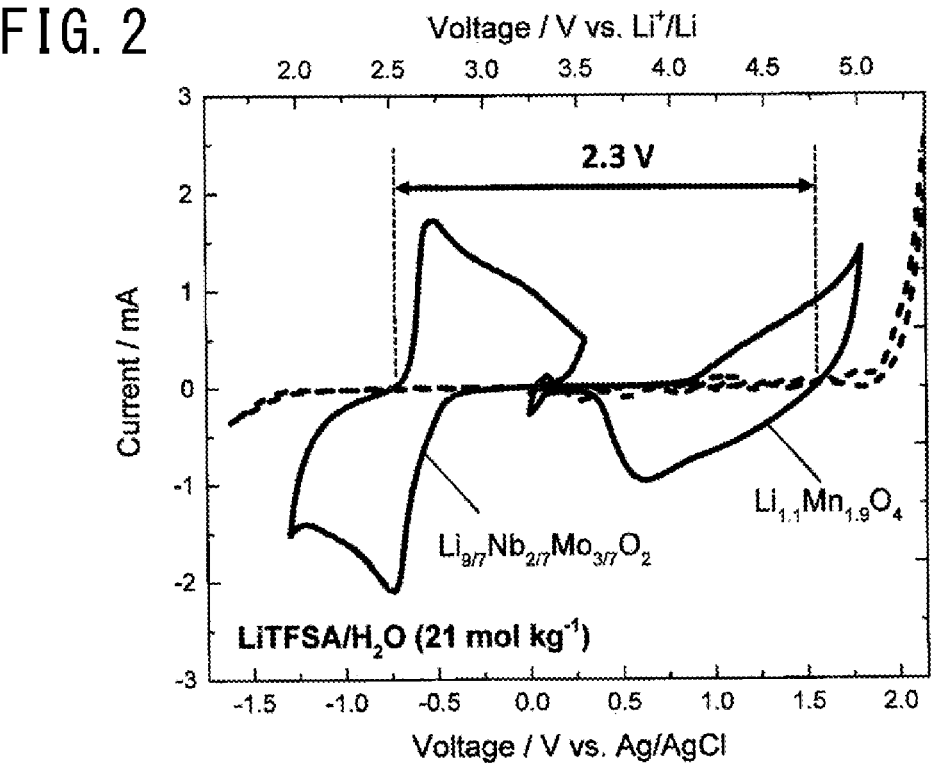
FIG. 2 is a cyclic voltammogram of $Li_{9/7}Nb_{2/7}Mo_{3/7}O_2$ and $Li_{1.1}M_{1.9}O_4$ in a high-concentration LiTFSI aqueous solution.

Here, FIG. 2 shows a cyclic voltammogram of $Li_{9/7}Nb_{2/7}Mo_{3/7}O_2$ and $Li_{1.1}Mn_{1.9}O_4$ in a LiTFSI aqueous solution having a high concentration of 21 mol/kg. FIG. 2 indicates that a voltage of 2.3V, which is sufficiently high for an aqueous solution electrolyte secondary battery, is obtained when a battery is assembled by using $Li_{9/7}Nb_{2/7}Mo_{3/7}O_2$ as a negative electrode active material and $Li_{1.1}Mn_{1.9}O_4$ as a positive electrode active material. That is, battery charging and discharging of 2.3 V class are possible within a potential window in which the high-concentration LiTFSI aqueous solution is stable.

<Sodium Ion Secondary Battery>

Figure 3:
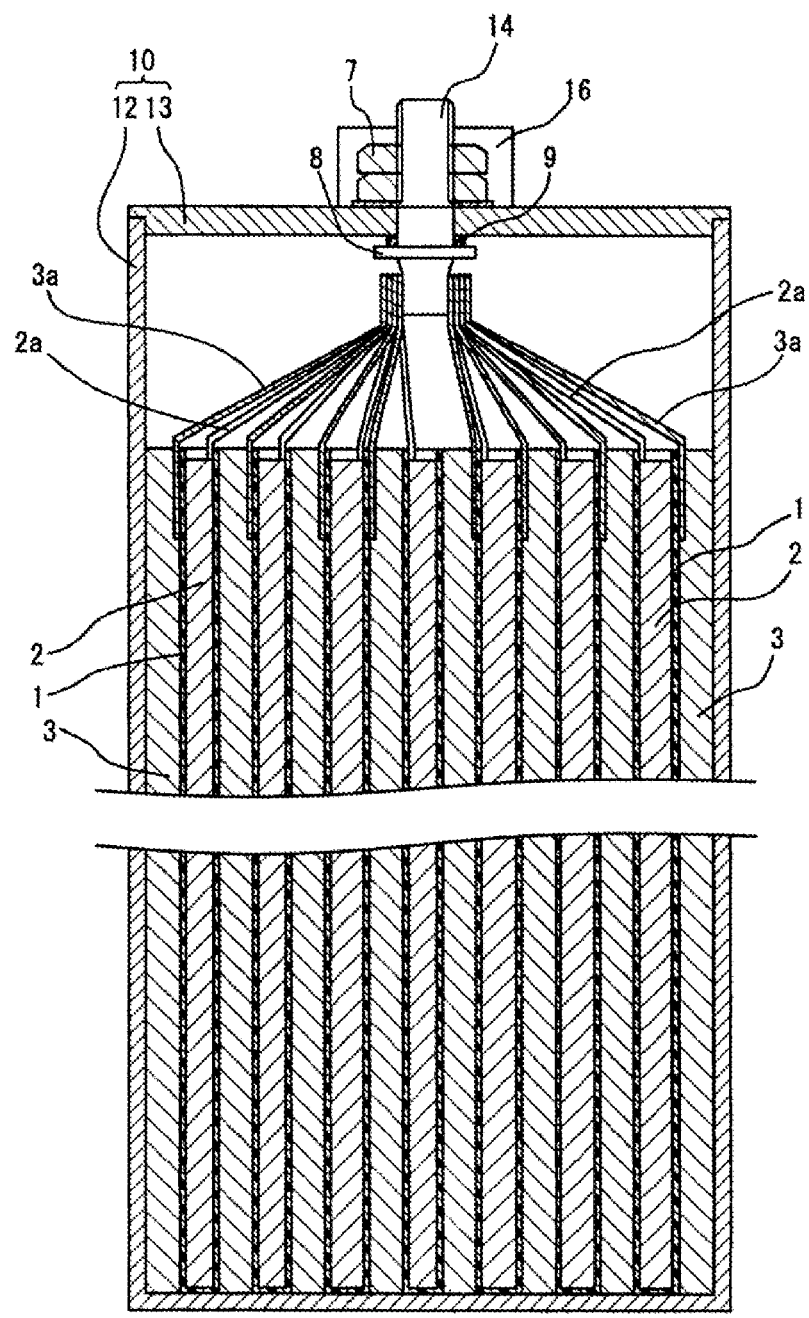
FIG. 3 is a longitudinal cross-sectional view of an aqueous solution electrolyte secondary battery according to an embodiment of the present disclosure.

Next, an example of the structure of the aqueous solution electrolyte secondary battery will be described. FIG. 3 is a longitudinal cross-sectional view schematically showing an aqueous solution electrolyte secondary battery 100 (hereinafter, referred to as battery 100) according to an embodiment. The battery 100 includes a stacked electrode assembly, an aqueous solution electrolyte (not shown), and a square type battery case 10 in which these components are housed. The battery case 10 is made of, for example, aluminum, and includes: a bottomed container body 12 that is open at an upper portion thereof; and a lid 13 that closes the upper opening of the container body 12.

A safety valve 16 for discharging gas, which is generated in the battery case 10, when the internal pressure of the battery case 10 rises is provided at the center of the lid 13. An external positive electrode terminal 14 that penetrates the lid 13 is provided closer to one side of the lid 13 with the safety valve 16 as a center, and an external negative electrode terminal that penetrates the lid 13 is provided at a position closer to the other side of the lid 13.

The stacked electrode assembly is formed by a plurality of sheet-like positive electrodes 2, a plurality of sheet-like negative electrodes 3, and a plurality of sheet-like separators 1 interposed therebetween. A positive electrode lead piece 2a is formed at one end portion of each positive electrode 2. The positive electrode lead pieces 2a of the plurality of positive electrodes 2 are tied together and connected to the external positive electrode terminal 14, which is provided at the lid 13 of the battery case 10. Similarly, a negative electrode lead piece 3a is formed at one end portion of each negative electrode 3. The negative electrode lead pieces 3a of the plurality of negative electrodes 3 are tied together and connected to the external negative electrode terminal, which is provided at the lid 13 of the battery case 10.

The external positive electrode terminal 14 and the external negative electrode terminal each have a columnar shape and have a screw groove at least on a portion exposed to the outside. A nut 7 is fitted to the screw groove of each terminal. The nut 7 is fixed to the lid 13 by rotating the nut 7. A flange portion 8 is provided at a portion of each terminal that is housed in the battery case 10. The flange portion 8 is fixed to the inner surface of the lid 13 with an O-ring-like gasket 9 interposed therebetween, by rotating the nut 7.

The positive electrode includes, for example, a positive electrode current collector and a positive electrode mixture supported on the positive electrode current collector, and the positive electrode mixture can include a conduction aid, a binder, etc., in addition to a positive electrode active material. For example, a metal foil is used as the positive electrode current collector. The material of the positive electrode current collector is preferably aluminum, an aluminum alloy, or the like.

The negative electrode includes, for example, a negative electrode current collector and a negative electrode mixture supported on the negative electrode current collector, and the negative electrode mixture can include a conduction aid, a binder, etc., in addition to a negative electrode active material. For example, a metal foil is used as the negative electrode current collector. The material of the negative electrode current collector is preferably copper, a copper alloy, nickel, a nickel alloy, stainless steel, or the like.

Examples of the conduction aids that can be included in the positive electrode mixture and the negative electrode mixture include carbon black, graphite, and carbon fiber. Examples of the binders include fluorine resins, polyolefin resins, rubbery polymers, polyamide resins, polyimide resins (polyamide imide, etc.), and cellulose ether.

The positive electrode current collector and the negative electrode current collector may each independently be a metal foil or a metal porous body, and are preferably a metal porous body since a thick high-capacity positive electrode and negative electrode can be formed. Even when thick electrodes are formed, if an aqueous solution electrolyte having high ion conductivity is used, ion transfer is not greatly disturbed, and sufficient utilization rates of the active materials can be achieved. If an aqueous solution electrolyte having a high ion concentration is used, higher utilization rates can be achieved.

As the metal porous body, a porous body having a three-dimensional network metallic skeleton (in particular, a hollow skeleton) is preferable. The metal porous body having a three-dimensional network skeleton may be formed by coating a porous body, which has continuous voids and which is made of resin (resin foam and/or non-woven fabric made of resin, etc.), with a metal that forms the current collector, by means of plating or the like. The metal porous body having a hollow skeleton can be formed by removing the resin within the skeleton by means of heating or the like.

The porosity of the metal porous body having a three-dimensional network skeleton is, for example, 30 to 99 vol %, preferably 50 to 98 vol %, and further preferably 80 to 98 vol % or 90 to 98 vol %. The specific surface area (BET specific surface area) of the metal porous body having a three-dimensional network skeleton is, for example, 100 to 700 cm$^2$/g, preferably 150 to 650 cm$^2$/g, and further preferably 200 to 600 cm$^2$/g.

As each separator, a microporous membrane made of resin, a nonwoven fabric, etc., can be used. Examples of the material of each separator include polyolefin resins, polyphenylene sulfide resins, polyamide resins, and polyimide resins.

Hereinafter, the present disclosure will be described in further detail on the basis of examples. However, the following examples are not intended to limit the present invention in any way.

<Synthesis of Complex Oxide>

LiMoO$_2$ was prepared as a first raw material, and three types of Li$_3$NbO$_4$, Li$_4$MoO$_5$, and Li$_2$TiO$_3$, were prepared as a second raw material. A first raw material mixture was obtained by mixing LiMoO$_2$ and Li$_3$NbO$_4$ at a predetermined mole ratio. Similarly, a second raw material mixture was obtained by mixing LiMoO$_2$ and Li$_4$MoO$_5$ at a predetermined mole ratio, and a third raw material mixture was obtained by mixing LiMoO$_2$ and Li$_2$TiO$_3$ at a predetermined mole ratio. Each raw material mixture was put into a device (Pulverisette 7, manufactured by Fritsch) for performing mechanical milling, and milling was performed in the air at 600 rpm for 32 hours, to obtain the following three types of single-phase oxides.

(A1) Li$_{9/7}$Nb$_{2/7}$Mo$_{3/7}$O$_2$
(A2) Li$_{4/3}$Mo$^{VI}_{2/9}$Mo$^{III}_{4/9}$O$_2$
(A3) Li$_{6/5}$Ti$_{2/5}$Mo$_{2/5}$O$_2$

Figure 4:
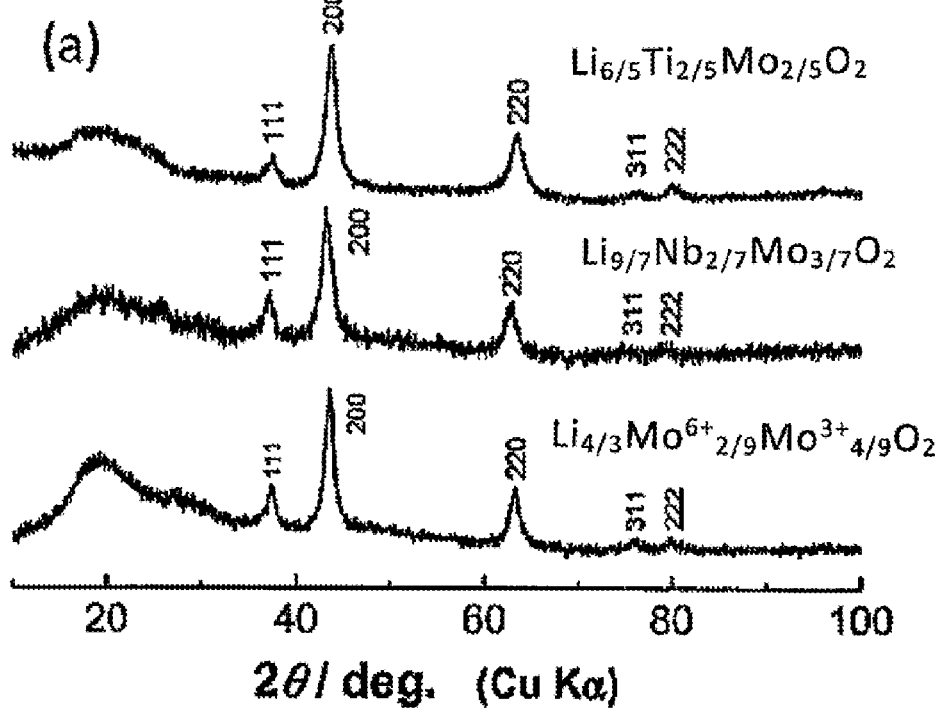
FIG. 4 shows XRD patterns of negative electrode active materials synthesized in an example.

XRD measurement of the single-phase oxides A1 to A3 was performed, and identification of crystal structures was performed. As a measurement device, a powder X-ray diffraction measurement device (MultiFlex) manufactured by Rigaku Corporation was used. XRD patterns of the single-phase oxides A1 to A3 are shown in FIG. 4. From FIG. 4, it can be understood that each single-phase oxide has a cation-disordered rock salt structure that is a single-layer structure.

EXAMPLE 1

<Negative Electrode>

A slurry was prepared by blending the single-phase oxide A1, acetylene black (AB), and polyvinylidene fluoride (PVdF) at a mass ratio of 80:10:10 and using an appropriate amount of N-methyl-2-pyrrolidone (NMP) as a dispersion medium. The obtained slurry was applied to one surface of a copper foil. The resultant coating film was sufficiently dried, and then stamped together with the copper foil, to obtain a coin-shaped negative electrode having a diameter of 1.0 cm.

<Positive Electrode>

A slurry was prepared by blending Li$_{1.1}$Mn$_{1.9}$O$_4$, acetylene black (AB), and polyvinylidene fluoride (PVdF) at a mass ratio of 80:10:10 and using an appropriate amount of N-methyl-2-pyrrolidone (NMP) as a dispersion medium. The obtained slurry was applied to one surface of an Al foil. The resultant coating film was sufficiently dried, and then stamped together with the Al foil, to obtain a coin-shaped positive electrode having a diameter of 1.0 cm.

<Aqueous Solution Electrolyte>

A LiTFSI aqueous solution having a concentration of 21 mol/kg was prepared by mixing LiTFSI and water at a mole ratio of 21:56, and used as an aqueous solution electrolyte.

<Charging and Discharging of Coin Type Battery>

A coin type battery was assembled by using the negative electrode, the positive electrode, and the aqueous solution electrolyte, and charging and discharging were repeated with a current value of about 10 mA/g per mass of the positive electrode active material at 25° C. within a range of 0 V to 2.6 V by 22 cycles. Charge and discharge curves obtained at that time are shown in FIG. 5.

Figure 5:
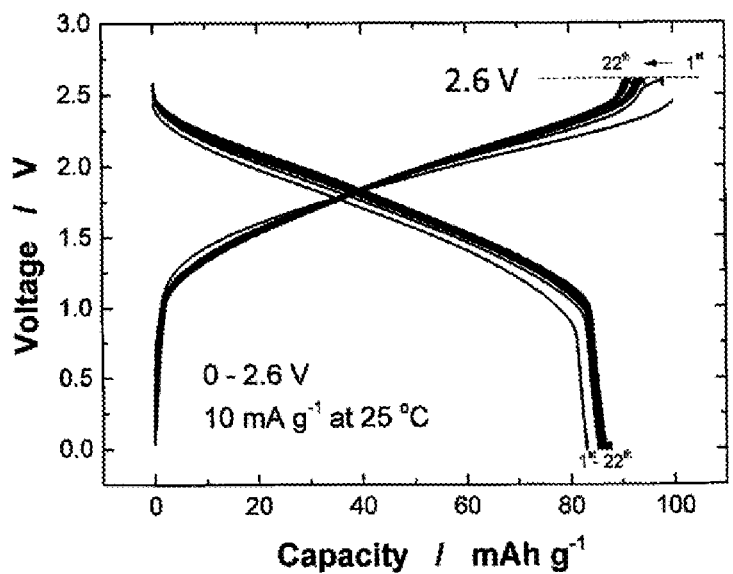
FIG. 5 is a diagram showing charge and discharge curves of an aqueous solution electrolyte secondary battery according to the example.

From FIG. 5, it was confirmed that, when the concentration of lithium ions derived from the lithium salt (TFSI) of the aqueous solution electrolyte is sufficiently high, an aqueous solution electrolyte secondary battery of 2.6-V class having good cycle characteristics is obtained. Also, when the single-phase oxide A2 or the single-phase oxide A3 is used instead of the single-phase oxide A1, an aqueous solution electrolyte secondary battery exceeding 2.0 V can similarly be obtained.

COMPARATIVE EXAMPLE 1

A coin type battery was assembled in the same manner as Example 1 except that a LiTFSI aqueous solution having a concentration of 1 mol/kg was prepared as an aqueous solution electrolyte by mixing LiTFSI and water and used as an aqueous solution electrolyte, and charging and discharging were repeated in the same manner as Example 1 by three cycles. Charge and discharge curves obtained at that time are shown in FIG. 6.

Figure 6:
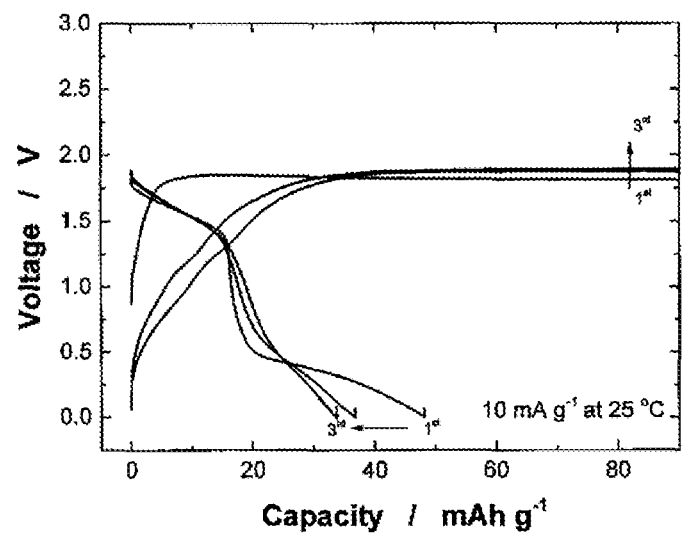
FIG. 6 is a diagram showing charge and discharge curves of an aqueous solution electrolyte secondary battery according to a comparative example.

From FIG. 6, it can be understood that, when the concentration of lithium ions derived from the lithium salt of the aqueous solution electrolyte is insufficient, or a room temperature molten hydrate is not formed, a voltage exceeding 2 V is not obtained and electrolysis of water proceeds.

EXAMPLE 2

Figure 7:
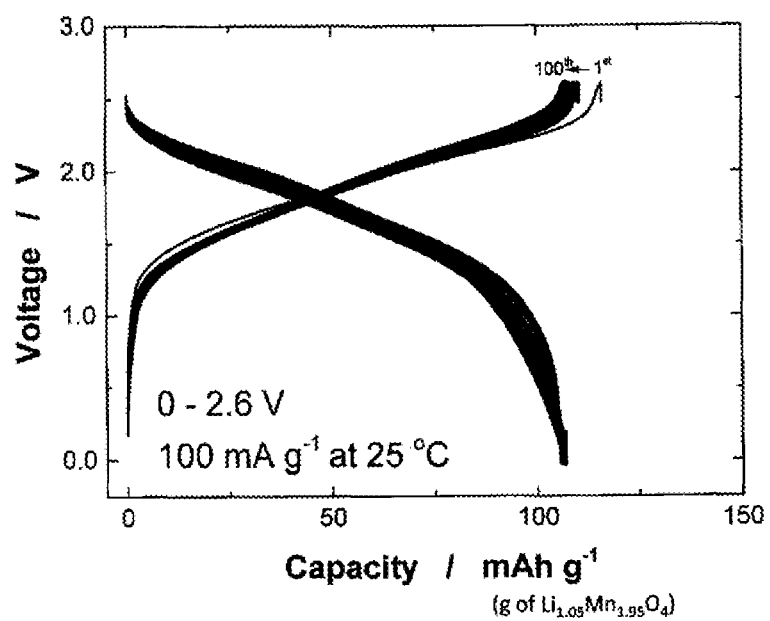
FIG. 7 is a diagram showing charge and discharge curves of an aqueous solution electrolyte secondary battery according to another example.

A coin type battery was assembled in the same manner as Example 1 except that the positive electrode active material was changed to $Li_{1.05}Mn_{1.95}O_4$, and charging and discharging were repeated in the same manner as Example 1 by 100 cycles except that the current value was changed to 100 mA/g. Charge and discharge curves obtained at that time are shown in FIG. 7. In addition, a relationship between cycle number and discharge capacity (mAh/g) is shown in FIG. 8.

Figure 8:
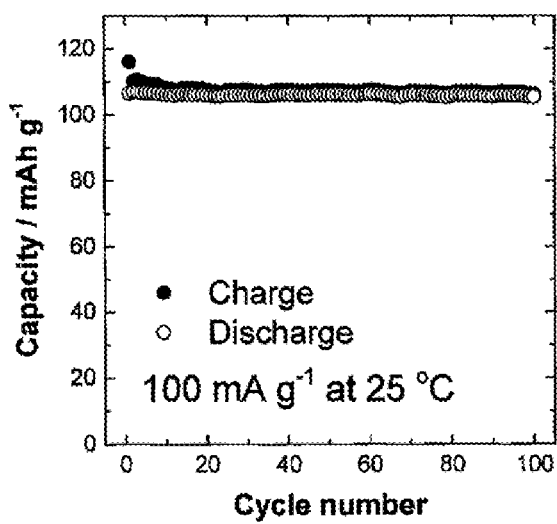
FIG. 8 is a diagram showing a relationship between cycle number and discharge capacity (mAh/g) of the battery.

FIG. 7 and FIG. 8 demonstrate that, even when the charging/discharging current value is changed to 100 mA/g, a sufficiently high capacity and a sufficiently high voltage are obtained and good cycle characteristics are obtained.

REFERENCE SIGNS LIST 1 separator
2 positive electrode
2a positive electrode lead piece
3 negative electrode
3a negative electrode lead piece
7 nut
8 flange portion
9 gasket
10 battery case
12 container body
13 lid
14 external positive electrode terminal
16 safety valve

The invention claimed is:
1. An aqueous solution electrolyte secondary battery comprising:
a positive electrode including a positive electrode active material that reversibly occludes and releases lithium ions;
a negative electrode including a negative electrode active material that reversibly occludes and releases lithium ions; and
an aqueous solution electrolyte in which a lithium salt is dissolved, wherein
the negative electrode active material contains Mo,
at least part of the Mo causes an oxidation-reduction reaction of $Mo^{3+}/Mo^{6+}$ through charging and discharging, and
a potential window for charging and discharging exceeds 2.0 V.
2. The aqueous solution electrolyte secondary battery according to claim 1, wherein the negative electrode active material contains a complex oxide containing tetravalent or higher transition metal Me, trivalent Mo, and Li.
3. The aqueous solution electrolyte secondary battery according to claim 2, wherein
the complex oxide contains at least one single-phase oxide selected from the group consisting of single-phase oxides having compositions of

$xLiMoO_2\text{-}(1-x)Li_3NbO_4$         formula [1],

$xLiMoO_2\text{-}(1-x)Li_4MoO_5$         formula [2], and

$xLiMoO_2\text{-}(1-x)Li_2TiO_3$         formula [3], and formulas [1] to [3] satisfy $0<x<1$.
4. The aqueous solution electrolyte secondary battery according to claim 1, wherein the aqueous solution electrolyte contains a lithium bis(perfluoroalkylsulfonyl)imide as at least part of the lithium salt.
5. The aqueous solution electrolyte secondary battery according to claim 1, wherein at least part of the aqueous solution electrolyte forms a room temperature molten hydrate.
6. An aqueous solution electrolyte secondary battery comprising:
a positive electrode including a positive electrode active material that reversibly occludes and releases lithium ions;
a negative electrode including a negative electrode active material that reversibly occludes and releases lithium ions; and
an aqueous solution electrolyte in which a lithium salt is dissolved, wherein
the negative electrode active material contains Mo,
at least part of the Mo causes an oxidation-reduction reaction of $Mo^{3+}/Mo^{6+}$ through charging and discharging, and
at least part of the aqueous solution electrolyte forms a room temperature molten hydrate.
7. The aqueous solution electrolyte secondary battery according to claim 1, wherein
the positive electrode includes a positive electrode current collector and a positive electrode mixture including the positive electrode active material supported on the positive electrode current collector,
the negative electrode includes a negative electrode current collector and a negative electrode mixture including the negative electrode active material supported on the negative electrode current collector, and
at least one of the positive electrode current collector and the negative electrode current collector has a three-dimensional network metallic skeleton.
8. The aqueous solution electrolyte secondary battery according to claim 6, wherein
the positive electrode includes a positive electrode current collector and a positive electrode mixture including the positive electrode active material supported on the positive electrode current collector,
the negative electrode includes a negative electrode current collector and a negative electrode mixture including the negative electrode active material supported on the negative electrode current collector, and at least one of the positive electrode current collector and the negative electrode current collector has a three-dimensional network metallic skeleton.

\* \* \* \* \*